United States Patent [19]

Phaal

[11] Patent Number: 6,006,269

[45] Date of Patent: Dec. 21, 1999

[54] ADMISSION CONTROL SYSTEM WITH MESSAGES ADMITTED OR DEFERRED FOR RE-SUBMISSION AT A LATER TIME ON A PRIORITY BASIS

[75] Inventor: Peter Phaal, San Francisco, Calif.

[73] Assignee: Hewlett-Packard Company, Palo Alto, Calif.

[21] Appl. No.: 09/038,868

[22] Filed: Mar. 11, 1998

[51] Int. Cl.[6] .................................................. G06F 13/00
[52] U.S. Cl. .......................................... 709/227; 709/103
[58] Field of Search .................................... 709/227, 228, 709/229, 217, 219, 226, 104, 105, 103, 225, 235, 232, 206, 207; 710/244, 241, 240, 39, 36, 38, 40; 711/9, 10, 2, 1

[56] References Cited

U.S. PATENT DOCUMENTS

| 5,006,978 | 4/1991 | Neches | 364/200 |
|---|---|---|---|
| 5,218,676 | 6/1993 | Ben-Ayed et al. | 395/200 |
| 5,377,354 | 12/1994 | Scannell et al. | 395/650 |
| 5,481,312 | 1/1996 | Cash et al. | 348/466 |
| 5,617,541 | 4/1997 | Albanese et al. | 395/200.13 |
| 5,623,603 | 4/1997 | Jiang et al. | 395/200.04 |
| 5,699,521 | 12/1997 | Iizuka et al. | 395/200.15 |
| 5,742,588 | 4/1998 | Thornberg et al. | 370/236 |
| 5,754,752 | 5/1998 | Sheh et al. | 395/182.02 |
| 5,799,002 | 8/1998 | Krishnan | 370/234 |
| 5,826,031 | 10/1998 | Nielsen | 395/200.63 |
| 5,881,238 | 3/1999 | Aman et al. | 395/200.56 |
| 5,884,033 | 3/1999 | Duvall et al. | 395/200.36 |
| 5,889,951 | 3/1999 | Lombardi | 395/200.49 |

Primary Examiner—Mehmet B. Geckil
Attorney, Agent, or Firm—Marc P. Schuyler

[57] ABSTRACT

This disclosure provides for admission control having enhanced quality of service. A server-resident admission control system implements measurement-based admission control to determine whether a requested web site is available to process a new session. If the site is not available, based upon current resources and defined load parameters, the server-based system determines when the associated server can later provide preferred access to the client, and transmits to the client an indication of that time, together with a key. One example uses a downloaded web page to automatically cause a client browser to later automatically access the host, and to display a message indicating that the client has preferred access together with a countdown time. As an alternative, a program file can be stored on the client which is effective to launch the client's web browser and to direct access to the particular host at the appointed time, irrespective of whether the client's browser is active.

24 Claims, 5 Drawing Sheets

ADMISSION CONTROL SYSTEM WITH MESSAGES ADMITTED OR DEFERRED FOR RE-SUBMISSION AT A LATER TIME ON A PRIORITY BASIS

The present invention relates to communications between computers and, more particularly, to enhancing quality of service in applications where one computer receives and processes messages from other computers.

BACKGROUND

Several protocols exist in which one computer (a "host") receives and processes messages from a number of other computers ("clients"). For example, in applications involving the world-wide web, a server can receive and process many concurrent messages from different personal computer users; in this example, the server would be the "host" while each personal computer would be a "client."

Messages can usually be grouped into sessions, with each session each having one or more related messages. For example, a multiple-message session could consist of a message requesting information over the world-wide web, and an associated response. Alternatively, a multiple-message session could consist of a commercial transaction, with related messages respectively used to locate a web site for a precise product, submit an order or billing and shipping information, and convey a confirmation of sale to a particular client. Whether a host is to process just a single message or a series of related messages, is usually important to quickly, accurately and completely service each message and each session.

The term "quality of service" refers both a host's ability to provide quick response to a message and to complete an entire session. As a particular host becomes more popular, and due to that popularity receives more messages, the host's processing resources can become stretched. For example, due to heavy traffic, a host may not be able to respond to a message at all, or the host may not provide a timely response (which can cause a client to "time-out" and generate an error). Poor quality of service can have significant results, as users may become frustrated and simply give up trying to reach a particular host, or the sponsor of the host may lose sales or fail to communicate needed information to any or all clients.

Two techniques are generally used to alleviate quality of service problems.

First, more processing capacity can be added to the host, typically by either replacing the host with another, more powerful computer, or by providing multiple computers in parallel and delegating new messages to different ones of the multiple computers. While this first technique presents an effective way of reducing some quality of service problems, it is not always practical. For example, sometimes, due to inadequate planning, budgetary constraints or space constraints, additional processing capacity simply cannot be added. Other times, if demand for a host is not properly forecast, there may be a long lead time before additional processing capacity can be purchased and implemented.

A second technique calls for applying "admission control," where only a certain number of client messages are processed ("admitted") and the remainder are refused; of the messages which are in fact admitted, all are ideally handled in an expedient manner without degradation of quality of service as to those admitted messages. An advantage of this technique is that admission control can be implemented in software, thus facilitating quick, inexpensive use with little advance notice. Unfortunately, typical admission control mechanisms operate by admitting messages on a message-by-message basis, and so, these typical admission control messages do not provide an adequate solution for multiple-message sessions. Also, the messages which are not admitted to the host are generally not handled at all, such that a client is not informed that the request has been refused or the client, if informed, is simply asked to "try again later." Typically, a refused client must try repeatedly to obtain service with no guarantee that future requests will be processed. For these reasons and others, techniques generally used to alleviate quality of service problems are not always successful.

A definite need exists for an admission control system having an improved ability to alleviate quality of service problems. In particular, a need exists for an admission control system which responds to all messages, whether or not those messages are actually admitted. Ideally, such system would operate by admitting entire sessions, not just individual messages, such that messages relating to a session in-progress are generally admitted. With a system of this type, admission control would at least provide a reliable means of finishing each session with high quality of service. Finally, a need exists for a system that provides some level of service to all clients, including those which have been refused admission. The present invention solves these needs and provides further, related advantages.

SUMMARY

The present invention provides an admission control system both which informs a client of a later time when the client can expect to gain admission to a site and which also provides a means of automatically (or electively) re-submitting a message at the appointed time. The present invention thus facilitates a response to all clients, even deferred clients, to thereby provide better quality of service. Further, however, the preferred admission control system is also session-based, such that once a message is admitted, all related messages (within the session) are processed on a priority basis, such that sessions in-progress can be completed quickly. By facilitating quick completion of admitted sessions, and providing an effective mechanism for handling deferred clients, the present invention provides a low-cost mechanism for significantly enhancing quality of service.

One form of the invention provides an admission control system having an admission control gateway, a deferral manager and a scheduler. When the admission control gateway receives a message that calls for a new client session, the gateway determines whether a processing threshold has been reached; if the threshold has been reached or surpassed, the message is passed to the deferral manager to formulate a response to the particular client. The scheduler is checked to determine a time when the host can expect to have processing resources available, and the deferral manager then formulates a time indication which tells the client when the client can expect to gain admission to the host.

In more detailed features of this first form of the invention, the deferral manager can determine a time for admission based on the use of reserved time slots, which are allocated on a first-come, first-served basis; optionally, a client can be afforded a choice of these slots, to pick a time convenient for the client's user. The deferral manager can then formulate a countdown time and provide the particular client both with the countdown time and a "key" that will enable the client to gain preferred access to the host at expiration of the countdown time. The key could be a "cookie" or a special password that, when passed to the host upon a retry, guarantees processing on a priority basis. In a different feature of the invention, the deferral manager can operate without specifically reserving time slots, and simply defer sessions in-progress if a priority message is received which would cause the host processor to operate with a greater-than-desired load. For purposes of assigning future times or appointments, the scheduler can operate in several different ways, for example, by setting "appointments" using a maximum number of new sessions per minute, or by monitoring periodic host activity and assigning future sessions when the host is normally "less busy." For example, if regular monitoring reveals that the host is usually not busy between 3:00 and 5:00 O'clock, the deferral manager could tell the client to try again during that time interval.

A second form of the invention provides client resident software for use in accessing a host. Specifically, the client resident software receives a countdown time from a host's deferral manager and manages "when" and "how" the client again attempts access to the host. This second form of the invention can be in the form of a web browser, which automatically maintains one or more countdown buffers or alarms, and which manage repeated attempts at access to the host. Alternatively, this second form of the invention can be a pervasive program which automatically launches a web browser when the appointed time has been reached.

The invention may be better understood by referring to the following detailed description, which should be read in conjunction with the accompanying drawings. The detailed description of a particular preferred embodiment, set out below to enable one to build and use one particular implementation of the invention, is not intended to limit the enumerated claims, but to serve as a particular example thereof.

DETAILED DESCRIPTION

The invention summarized above and defined by the enumerated claims may be better understood by referring to the following detailed description, which should be read in conjunction with the accompanying drawings. This detailed description of a particular preferred embodiment, set out below to enable one to build and use one particular implementation of the invention, is not intended to limit the enumerated claims, but to serve as a particular example thereof. The particular example set out below is the preferred specific implementation of an admission control system, namely, one which provides priority access based on multiple classes of service, deferral of certain messages, and a web page downloaded to a client having automatic or elective attempts to later attain access. The invention, however, may also be applied to other types of systems as well.

I. INTRODUCTION TO THE PRINCIPAL PARTS

The preferred embodiment is an admission control system resident on a server, a client computer (typically a personal computer), or both. The admission control system may be implemented in firmware, hardware, or software, but most typically will be implemented in software such that it can be optionally implemented on a server which has processing resources which are sometimes strained. The preferred application of the admission control system is to systems involving access and processing on the world-wide web (the "web").

In accordance with the principles of the present invention, the preferred admission control system normally admits messages to a server, but if processing resources of the server are strained, the admission control system defers messages corresponding to new sessions to a later time when it is thought that the server can guarantee processing of the deferred message as a priority message and any corresponding session. The admission control system formats a response to the client, to inform the client's user that access has been deferred, and accords the client a means of later obtaining access on a priority basis if the client contacts the server again at the proper time.

On the client side of the admission control system, the client's user is preferably afforded a means of automatically contacting the server again, once the appointed time has been reached. In the preferred embodiment, the admission control system operates principally on the server and formats a special web page which is downloaded to the client as part of a deferral message. This special web page provides a countdown function, visible to the client's user, which indicates time until re-submission in minutes or seconds; if the client closes the browser or uses it to contact a different web page, the web page is disabled and the client will not automatically contact the server (in the preferred embodiment). This implementation is preferred, because it can be implemented entirely in software on the server side (including formation of the special web page which is downloaded to the client).

Figure 1:
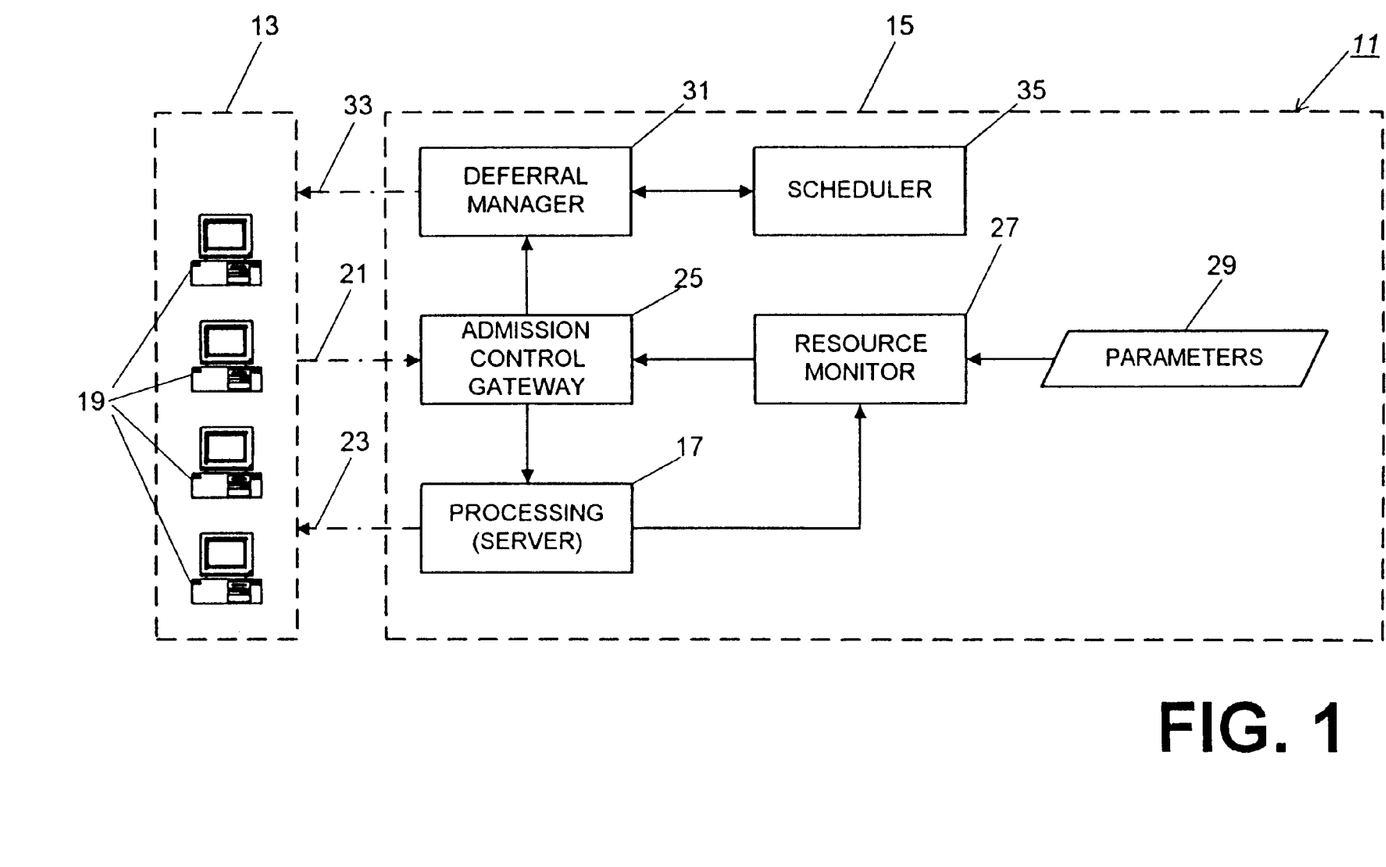
FIG. 1 is a block diagram of a preferred admission control system which implements principles of the present invention. In particular, FIG. 1 at its left shows a plurality of clients which may communicate with a host processing system, seen at the right side of FIG. 1.

FIG. 1 shows a block diagram illustrating a preferred admission control system 11. In particular, the diagram illustrates a hypothetical connection between a client side 13 and a host side 15. The host side includes one or more servers 17. Notably, it is common to find configurations where several servers are arranged in parallel to share processing responsibility for a single web page (such as a "round-robin" configuration), but for the present discussion it will be assumed that only one server is present; the present invention can be implemented on multiple-server systems as well. The client side 13 may include many individual personal computers 19, which may each contact the host side 15 via a complicated network of communications paths and nodes. Irrespective of the particular communication path, the host side 15 receives a stream of incoming messages 21 which may access one or more web pages stored on the server 17, and provides a stream of outgoing response messages 23 in response.

Admission control is effected by passing the incoming messages 21 to an admission control gateway 25, which determines whether to admit the messages to the server 17. Messages corresponding to sessions in-progress are preferably always admitted, such that the user of a client can reliably expect a transaction with a server, once initiated, will be completed. It is believed that ensuring completion of sessions in-progress will promote less user frustration, e.g., commercial transactions over the web, once begun, will be reliably completed to satisfaction of the user. At the same time, rather than stretch processing resources of the server, if too many new messages are received, the admission control system defers at least some amount of those messages, such that sessions in-progress can be reliably and quickly completed through the use of un-stretched server resources. A mechanism for responding to deferred clients preferably includes an affirmative statement about admittance, e.g., that the client will later be admitted at a time specific, to avoid too much frustration on the part of users of deferred clients.

The admission control system of the preferred embodiment includes a resource monitor 27, which provides information on current use of server resources. The resource monitor is typically a set of code that uses a standard call function provided by most server protocols; the call function returns a value having a particular format, depending upon the server. For example, some servers will return a percentage, indicating present resources which are "occupied," while other servers may return an numeric value which is not based on a decimal scale (e.g., not a number from one to ten or one to one-hundred); Other servers may return a counter which needs to be polled periodically to determine resource utilization.

A message received by the admission control gateway 25 is first analyzed to determine whether it corresponds to a session in-progress. If a session has already been established (and the newly-received message is a part of a continuing transaction between the server and a particular client), then the message is preferably admitted to the server. If not, the resource monitor 27 can be used to determine whether the message is to be admitted as the start of a new session. To this effect, the resource monitor 27 is coupled to a set of one or more parameters 29 which are stored in a buffer. These parameters define a desired maximum load (or threshold for deferral) which may be static or may vary, depending upon the embodiment of admission control. For example, one embodiment discussed below uses reserved time slots which can be allocated to deferred messages; if a large volume of deferred messages are scheduled for processing on a priority basis at three O'clock, a stored parameter can be set for three O'clock to define a lower threshold, such that more messages (which are non-priority messages) are deferred than normal at that time. In the preferred embodiment, a static figure is used (e.g., eighty percent), primarily for simplicity in implementation. The admission control gateway 25 compares the set of at least one parameter with the result of the call function and, if the comparison indicates that server processing resources have exceeded the threshold, then new sessions not having priority are deferred.

Since the admission control gateway 25 defers some messages corresponding to new sessions when resources are stretched, it is desired to provide some reply to a client system which submitted the message, in order that the user of the client system will not become frustrated or continually re-submit the message (thereby further overloading server resources). To accomplish this end, the admission control system 11 further includes a deferral manager 31, which formats and provides a response message 33 to the client system which submitted the deferred message. Preferably, the deferral manager 31 is coupled to a scheduler 35 which, together with the deferral manager, calculates a later time when it can be expected that the deferred message can be processed by the server 17. The scheduler has many possible implementations for obtaining such information. For example, the scheduler can compile statistics based on day-to-day operation of the server and times when the processing resources of the server tend to be less strained; in this example, the scheduler could determine that a particular server is "less busy" from twelve O'clock noon until one O'clock P.M., and could defer a client system until twelve O'clock noon and the one hour time range thereafter. Alternatively, the scheduler could simply set "appointments" (e.g., two for every five minutes) and simply return to the deferral manager 31 a time for the next available appointment. In the preferred embodiment, the scheduler uses the latter function and defers messages for at least a minimum predetermined amount of time, e.g., 300 seconds or more as indicated by Table I, below; in conjunction with a time set by a web page which is downloaded to the client, the client's message is later accepted on a priority basis if the client contacts the server within a defined interval following the time. Implementation of the scheduler is effected in the preferred embodiment via software.

A number of mechanisms can also be implemented such that the admission control system 11 recognizes a deferred message as a priority message following re-submission. In the preferred embodiment, the deferral manager 31 generates a "key" in the form of a "cookie" which the admission control system writes to a hard disk of the client system. When access is again requested by the client system, the admission control gateway 25 interrogates the client system to determine whether the cookie is present and, if so, the admission control gateway accords priority status to a message from the client system at that time, in terms of generating a new session. In addition to writing the cookie to the client system, the deferral manager 31 also generates an informative web page which it downloads to the client's browser. This web page visually displays to a user of the client system an informative message, e.g., "We're sorry, but our server is temporarily serving other clients; to better assist you, we have scheduled an appointment for your transaction, and if you do not exit this web page, your browser will automatically contact us in 23 seconds."

The numeric figure in the above message is a countdown time, and the web page generated by the deferral manager automatically establishes a countdown mechanism on the client system. The countdown time is continually displayed to a user, and once the time reaches zero, the web page automatically directs the browser to the same URL which resulted in the deferral, and the admission control gateway 25 checks for the presence of the aforementioned cookie.

Certain alternative implementations are also discussed below, where a web page is not used; these embodiments include systems where the browser is a modified browser on the client side, which includes a buffer (not visible to the client's user) for storing a uniform resource locator ("URL") of a server which has deferred access, together with an appointment time. The modified browser is effective to (in the "background" as far as concerns the user) automatically detect when the appointed time has been reached and then cause the browser to submit a priority message for processing by the client. Ideally, the user is afforded in this embodiment an election at some point during the process, as to whether the user wishes to establish deferred access. The browser is then directed to automatically open up a separate window for each new session initialized via the buffer. Ideally also, the buffer of the modified browser can store indications for several deferred, priority sessions, and the modified browser is effective to order such indications such that they are used to establish deferred sessions at the proper times, regardless of the order in which the indications are received.

It should be understood that the preferred application is to Hypertext Transfer Protocol ("HTTP"), but that there are many applications for the admission control system of the present invention. For example, common protocols to which admission control can be applied include Internet Protocol, User Datagram Protocol, Simple Mail Transfer Protocol, Network File System Protocol, applications on local area networks, and other communications protocols where a host services one or more client systems.

With the principle features of the preferred embodiment (and some of the alternative embodiments) introduced, implementation of the preferred embodiment will now be further described.

II. SERVER SIDE ADMISSION CONTROL

Figure 2:
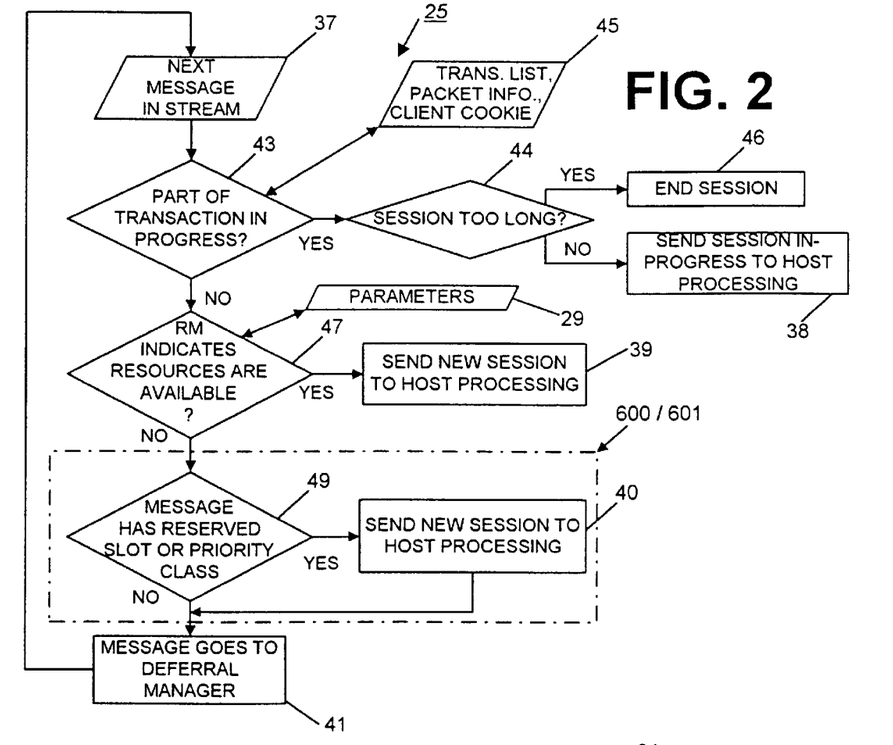
FIG. 2 is a block diagram that indicates operation of an admission control gateway, seen in FIG. 1.
Figure 3:
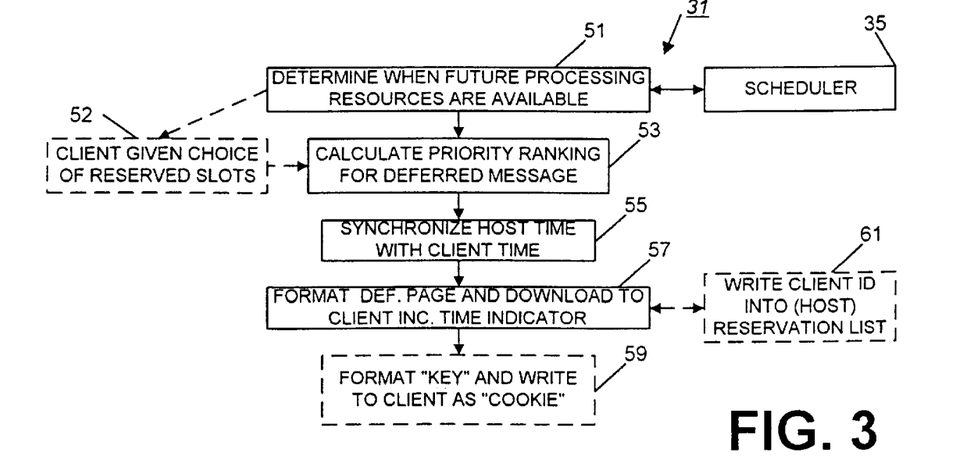
FIG. 3 is a block diagram that indicates operation of a deferral manager, seen in FIG. 1.

FIGS. 2 and 3 are used to illustrate operation of the admission control on the server side in additional detail. In particular, FIG. 2 shows additional detail for the operation of the admission control gateway 25, whereas FIG. 3 shows additional detail regarding the operation of the deferral manager 31.

As seen in FIG. 2, the admission control gateway 25 processes each next message 37 in the stream by either sending the message to host processing (e.g., to the server), as indicated by the reference numerals 38, 39 and 40, or by sending the message to the deferral manager, as indicated by the reference numeral 41.

The admission control gateway first interrogates each message to determine whether the message is part of a session in-progress, as indicated by a software block 43. Several different types of data can be used for this purpose, as indicated by a data block 45. First, the admission control gateway can maintain a transaction list which includes information on the requesting client and the session at-issue; the admission control gateway monitors header information for each message and simply determines whether information corresponds to a list of sessions in-progress. Second, the admission control gateway can simply look for a particular password or identifier provided with the packet information for the message. Third, the admission control gateway can also look for a client cookie which has been written to the requesting client, by simply interrogating the client via a response message to determine whether the cookie is present. Of these processes, a transaction list is preferably used as the most expedient of these processes.

For sessions which are in progress, the admission control gateway 25 applies criteria to limit overall session length (as represented by reference numeral 44 in FIG. 2), so as to ensure that all sessions are terminated as of some point in time. For example, as seen in Table I (below), session length may be capped to 1800 seconds, with the admission control gateway invalidating any session which exceeds that length of time, as designated by the reference numeral 46. When sessions are admitted, they are assigned to a class, and the class identifier is included in a cookie stored on the associated client system. The server or admission control system keeps statistics for each request processed, for example, statistics on the last 1000 requests (for each class, if multiple classes of priority are used). Typically, a server will not need to terminate sessions, but it (via the admission control system) will simply stop admitting sessions in an overrepresented class and allow natural attrition to reduce its population. If this does not occur quickly enough then sessions are terminated by invalidating their session cookie. In each case where a cookie is used, alternative state tracking mechanisms can be used. The server could have a table of the states of the current sessions and simply update or read entries from that table. Sessions which have not been in-progress for an excessive length of time are passed along for processing, as indicated by the block 38.

If the message is not part of a transaction in-progress, the admission control gateway 25 can also admit the message as a new session if it is determined that the server has sufficient processing resources available, as determined by comparison with the set of parameters 29 (indicated in FIG. 2 by the reference numeral 47). The admission control gateway 25 can further admit the message if it is determined that the message corresponds to a message which has been previously deferred, as indicated by a decision block 49. In this regard, these two determinations can be performed in alternative order depending upon the particular implementation. For example, in an embodiment where reserved time slots are used and dynamic parameters 29 are used to regulate un-reserved (or contention) time slots, it is preferable to detect new sessions having reserved time slots so as to not reduce the number of contention slots available. In the preferred embodiment, specific slots are not used and the parameters 29 include a single, static threshold, with lowest priority (e.g., most recently received, non-priority) messages being deferred, even if already in-progress, if the server only has processing resources for priority messages. Consequently, the determinations can equivalently be performed in the preferred embodiment in the order indicated in FIG. 2. Notably, processing using reserved time slots or priority classes is identified as a processing block by the reference numeral 500/501, and will be discussed further below. If the determinations do not result in admission of the message to the server, then the message is sent to the deferral manager, as indicated by the bottom most block 41 of FIG. 2.

The operation of the deferral manager 31 is indicated in FIG. 3, and results in the sending of a deferral message to the client system, and the creation of a priority identifier that permits re-submission of the deferred message on a priority basis. In the preferred embodiment, the deferral manager operates in communication with the scheduler 35 to determine a time when future processing resources of the server will be available on a priority basis for deferred messages (as indicated by a functional block 51 of FIG. 3). The code which implements the deferral manager then proceeds to calculate a priority ranking for the deferred message, as indicated by block 53 of FIG. 3. Optionally, if reserved time slots are used, the admission control system can give the client system a choice of reserved time slots, as indicated by the block 52 of FIG. 3; this function can either be done by permitting the user of a client system to select from available time slots, or by taking a preferred client time and if slots are unavailable, requiring the client to choose from other options. In the preferred embodiment only two classes of service are used, namely, for priority messages and for messages not having priority status; additional distinctions are made based upon newest session (i.e., a priority message representing the most recently commenced priority session is viewed as less important than priority sessions in-progress, and a non-priority message corresponding to the most recently commenced non-priority session is viewed as less important than other non-priority sessions in-progress). As a consequence, block 53 operates in the preferred embodiment by simply ascribing priority to any deferred message.

Importantly, in one preferred embodiment, a number of classes of service can be made available for messages and different web pages, each having different priority ranking (1 to n). For example, if a server is used to support the web pages of two companies, and one company pays a premium fee for support of a first web page, then messages directed to the first web page can be given priority when the server's overall processes are strained, priority including preferred access over messages directed to the second web page. Alternatively, if processing resources become very stretched and reserved time slots are not used, it is possible that a server could at a particular point in time be processing only priority messages, in which case a message representing new session could in some embodiments be deferred twice; using multiple classes of service, the again-deferred message could receive a second step upward in priority, and so on. Additional details regarding applications using multiple classes of service are discussed in U.S. patent application Ser. No. 09/038,657, for "Host Processing With Multiple Classes of Service," filed on the same date as this disclosure by inventor Peter Phaal, which is hereby incorporated by reference in its entirety, as though set forth herein.

The deferral manager 31 then proceeds with the optional step of synchronizing host time with client time (indicated by block 55). This process can be as simple as calculating a countdown time in seconds and downloading that information to the client system (as is done in the preferred embodiment), or in alternative implementations, the deferral manager can interrogate the client system to determine differences in time, and adjust the time indicator sent to the client accordingly. As indicated by block 57 of FIG. 3, the deferral manager 31 formats an informative message including the time indicator and sends this information to the client system, preferably including a message having a purpose to avoid user frustration (e.g., a message indicating that the client's request will be processed at a specific time, with automatic re-submission by the client's web browser). Preferably, the informative message is contained within a deferral web page which stores the URL of the server for which deferral occurred, and the deferral web page again submits the same URL at expiration of a countdown time.

The deferral manager 31 also stores an identifier of priority status for each deferred message, via one of two alternative mechanisms (each indicated by dashed lines in FIG. 3). First, the identifier can be formatted as a "key," such as a password or cookie written to the client system (indicated by reference numeral 59) which identifies priority status. Alternatively, the deferral manager can (as indicated by block 61 of FIG. 3) write the identifier into memory on the server side of the admission control system, as part of a list. Use of a cookie is preferred, since such an implementation minimizes the amount of processing time required of the deferral manager, hence provides for greater throughput in processing deferred messages if a large number of deferrals are occurring. The cookie should include a unique identifier for the particular server (or web page), and it should also be time-limited; the cookie can either include the time indicator itself (i.e., a cookie which varies from message-to-message), or it could be a unique value that changes each day, for example.

A. SCHEDULER OPERATIONS.

The scheduler may operate in any of a number of ways in order to optimize server processing. Preferably, the user of a client system should not have to wait long prior to re-submission of a message and, consequently, the preferred embodiment allocates appointments up to a predetermined number of deferred sessions per minute, and assigns messages as soon as possible after deferral. This predetermined number of sessions can be varied using a server side configuration screen [indicated in Table I, below]. The configuration screen also specifies an exclusion time during which is the minimum amount of time following deferral for a corresponding appointment.

In an example indicated in Table I, below, the minimum time before an appointment is indicated to be 300 seconds, with a maximum number of deferred sessions indicates as ten sessions per minute. In this example, if a total of 22 sessions were to be deferred at approximately 3:00 P.M. (and there was no backlog of deferred messages), the deferral manager 31 would provide priority to the first ten messages if they re-submitted their messages between 3:05 P.M. and 3:06 P.M., the next ten message between 3:06 P.M. and 3:07 P.M., and the final two messages between 3:07 P.M. and 3:08 P.M. If another message received at 3:01 P.M. was to be deferred, the message would receive priority between 3:07 P.M. and 3:08 P.M., together with the $21^{st}$ and 22d messages referred to above. It the message were instead received at 3:04 P.M. (instead of at 3:02 P.M.), the deferral manager and scheduler would assign priority to the message between 3:09 P.M. and 3:10 P.M., even if there were no backlog of messages.

TABLE I (SAMPLE ADMISSION CONTROL CONFIGURATION SCREEN)

[About | Index | Statistics ]
                              Web Flow Settings
Admit Sessions:
[ ] Shutdown in [600] seconds.
[ ] Always (disables dynamic admission control).
[X] If Load < [5.00]
End Sessions When:
[ ] interval between requests > [600] seconds.
[X] or, session duration > [1800] seconds.
Respond to Rejected Sessions with:
[ ] a redirect to [        ] (leave blank if no redirection required),

TABLE I-continued (SAMPLE ADMISSION CONTROL CONFIGURATION SCREEN)

and then if redirected request cannot be accepted or redirection is disabled, respond with:
[ ] Error
[X] Page [count_down.htm]
[X] Allocate up to [10] sessions per minute.
[ ] External
and then exclude them for [300] seconds.

As further indicated by Table I, the server side configuration screen provides for adjustment of maximum load prior to deferral, for admission control to be turned "off," and also permits a number of other options in controlling admission.

III. CLIENT SIDE ADMISSION CONTROL

Figure 5:
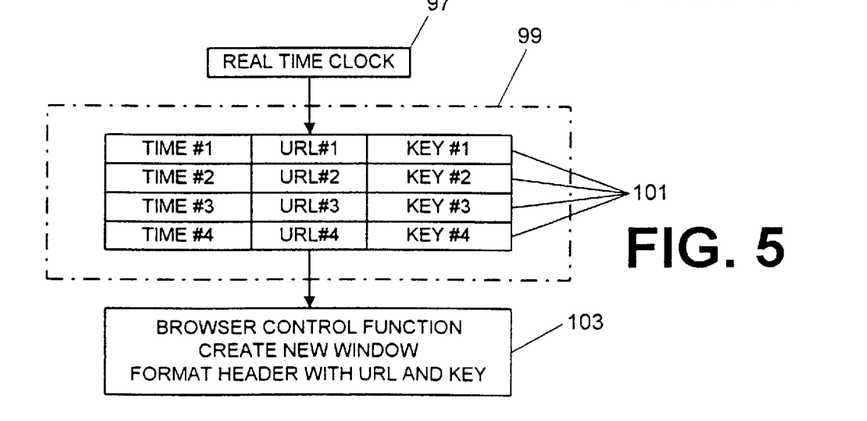
FIG. 5 is a block diagram showing an alternative client access mechanism, namely, a web browser maintains, once deferred by a host, one or more alarm buffers which are used to alert a user when the host is expected to be available.

Client side admission control is preferably achieved automatically by the admission control system, using the deferral manager to format and download to the client a web page that automatically redirects the client's browser back to the particular server when the proper time has been reached. Presently contemplated alternative implementations of client side admission control include: a pervasive program file, which launches either the client's web browser (if the client's browser has been such down) or an additional browser window (if the client's browser is active); and, a modified web browser which automatically stores several appointments for deferred server access. Each of these implementations will be discussed below, with reference to FIGS. 6A, 6B and 5, respectively.

A. CONFIGURATION OF DOWNLOADED DEFERRAL WEB PAGE.

Figure 4A:
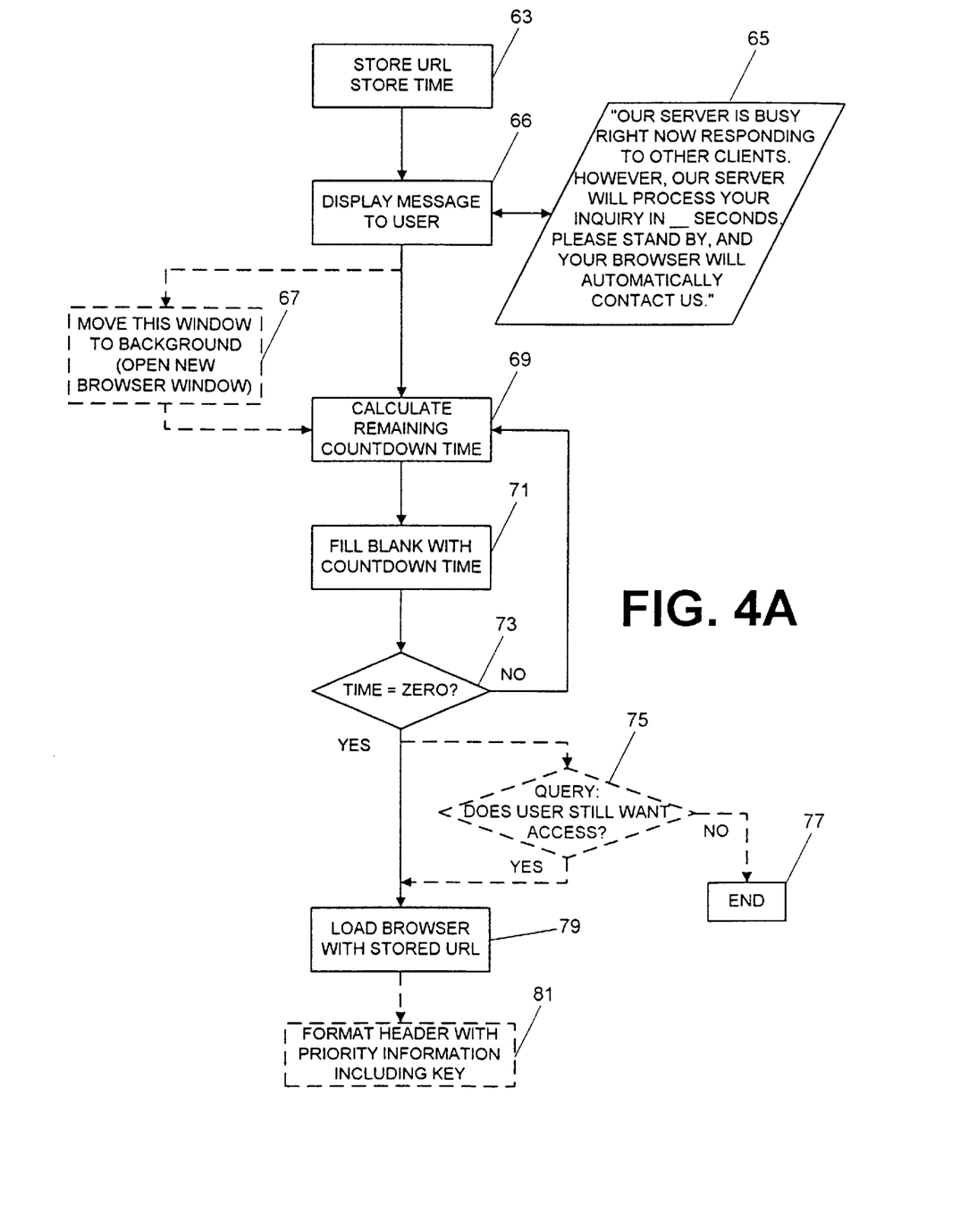
FIG. 4A is a flow diagram indicating the operation of a preferred client access mechanism, namely, an exemplary web page which can be formatted by a deferral manager and downloaded together with a special "cookie" to a client. The web page seen in FIG. 4A implements a countdown timer which, once a predetermined amount of time has elapsed, is used in conjunction with the cookie to gain access to a host which was earlier too busy to process requests from the client.

FIG. 4A presents a flow diagram for the web page which is preferably formatted by the deferral manager 31 and sent to the client system. As indicated by FIG. 4A, the web page operates as a program and includes, in addition to HTML format instructions downloaded to the client system, of a URL and time indicator which are stored in random access memory ("RAM") of the client system, as indicated by the top-most reference block 63 of FIG. 4A. The HTML format instructions cause the client system to continually display a text message to the client's user substantially in the format indicated by data block 65 of FIG. 4A. Preferably, the text message includes a positive statement indicating that the client's request for access has been deferred but that alerts the user that the request will be automatically resubmitted at a specific time.

As with other web pages, the deferral web page is actually downloaded to memory of the client's system, and the browser will continue (as indicated by block 66) to display the page until the user either attempts to access a different URL or shuts-down the browser. In an optional implementation (indicated by the function block 67, represented in dashed lines), the web page could direct the browser to open a new window, such that the user can access other URLs while one window continues to display the deferral web page.

As indicated by blocks 69, 71 and 73 of FIG. 4A, the deferral web page preferably continues to calculate countdown time and to replace time remaining in the text message with a current countdown time; the web page with each decrement checks the countdown time to determine whether it has reached zero, and if so, proceeds to automatically attempt to access the same URL which earlier resulted in deferral. An optional dialog box can be presented to the user of the client system when the countdown time reaches zero, querying whether the user still wants to access the same web page which earlier resulted in deferral, all as indicated in dashed lines by the box 75 of FIG. 4A. If the user no longer wishes access, the operation of the web page (e.g., the countdown function) ends, as indicated by block 77 of FIG. 4A. Whether access is automatic or elective with the user, the web page proceeds to re-submit the same URL which originally resulted in deferral, as indicated by block 79 of FIG. 4A. If priority is represented by a cookie stored on the client system (or with a password), the web page can be configured to automatically load header information for the URL request with priority information, as indicated by block 81. This function 81 is indicated as optional (i.e., by dashed lines in FIG. 4A), because as mentioned earlier, it is preferred to use interrogation of the cookie on the hard drive of the client system by the admission control gateway to resolve priority.

B. DOWNLOADED OF PERVASIVE PROGRAM TO CLIENT.

Particularly in applications where session length is long, or where a long time (i.e., greater than 15 minutes) is required prior to priority access to the server, it may be desirable to download a program file to the client's hard disk for operation outside of the client's browser. Such a program file could be implemented in java script or as a batch file.

Figure 4B:
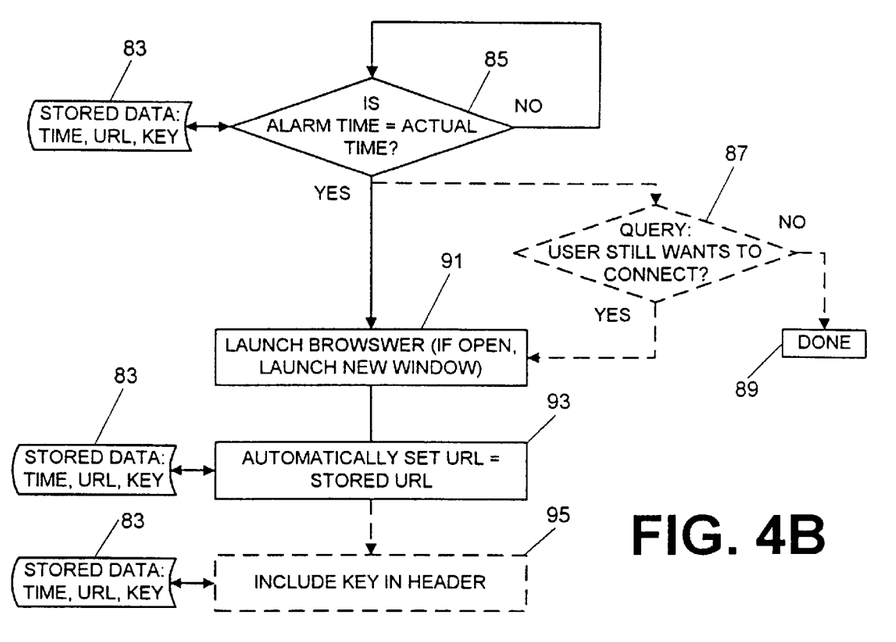
FIG. 4B is a flow diagram showing an alternative client access mechanism, where a file is downloaded to a deferred client; the file runs on the clients computer to normally monitor time, and provides an alarm at a time when the deferred client can expect to gain admittance to the host. The file in this embodiment is preferably pervasive, such that it provides an alarm and permits direct launch of a communication mechanism, such as a web browser.

As indicated by the data block 83 in FIG. 4B, such a program file would include data representing a time (synchronized with host time in connection with download by the deferral manager), together with a URL for the web page which resulted in deferral and a key or cookie, if appropriate; the key or cookie could also be stored separately on the client's hard drive as a data file, or on the server in the form of a list. The program file operates to establish an alarm function 85 which continually (i.e., repeatedly and frequently) checks time using a real time clock of the client system to determine time for access to the server. If an alarm is sounded, the program file may optionally query the user of the client system whether access is still desired, as indicated by the function block 87, and if access is not desired, the program may end, as represented by the function block 89. Whether or not access is automatic or elective, the program file opens up a new browser window (or launches a first browser window, as indicated by block 91) and automatically directs the browser to the web site which earlier resulted in deferral. During this process, as indicated by the block 93, the browser accesses the stored data 83 including the URL. If appropriate to the particular implementation, the program file can also use the stored data 83 to format header information as appropriate, as indicated by the function block 95 of FIG. 4B.

C. USE OF A MODIFIED WEB BROWSER.

Use of a web browser that is specially adapted for use in the present invention is another embodiment, albeit not the preferred embodiment because it cannot be implemented solely by software operating on the server side. Indicated by FIG. 5, such a browser should be in with a real time clock 97, and use information provided by the clock to access a buffer 99. This buffer, which is implemented in RAM on the client system, has memory locations 101 directed to each URL for which an appointment has been scheduled, together with an appointment time and, as appropriate to the embodiment, a key enabling priority access. At least one such memory location is used by the browser software, and preferably at least four memory locations are used. Th the browser automatically implements an alarm for a deferred message at the proper time, not withstanding the order in which deferral messages are received from a deferral manager. The web browser preferably includes a function that recognizes a deferral message, and which automatically retrieves each URL and corresponding appointment time for storage in the buffer. Alternatively, the deferral manager can include software for recognizing a browser which supports appointments for deferred messages, and which automatically writes the appropriate URL and appointment time into the appropriate memory location 101. Once an alarm is reached, the browser automatically creates a new window dedicated to the URL which originally resulted in deferral, and includes header information (including a key) as appropriate in a message requesting access, all as indicated by the block 103 in FIG. 5.

Modification of a web browser to support the above-recited functionality is considered within the skill of one familiar with software design, and could be added in straightforward manner to source code for common browser programs, such as programs made by "Microsoft" and "Netscape."

IV. USE OF MULTIPLE CLASSES OF SERVICE AND OF CONTENTION AND RESERVED TIME SLOTS

Figure 6A:
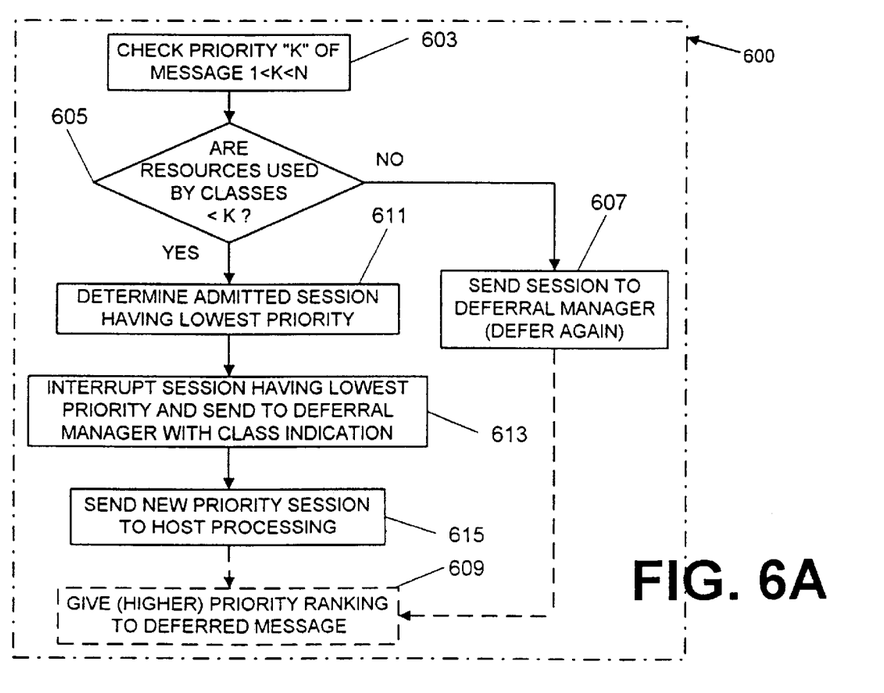
FIG. 6A is a flow diagram which indicates operation of a block 600/601 of FIG. 2, namely, a portion of the preferred admission control gateway which processes or defers new sessions based on assigned class of service and which also assigns class of service.
Figure 6B:
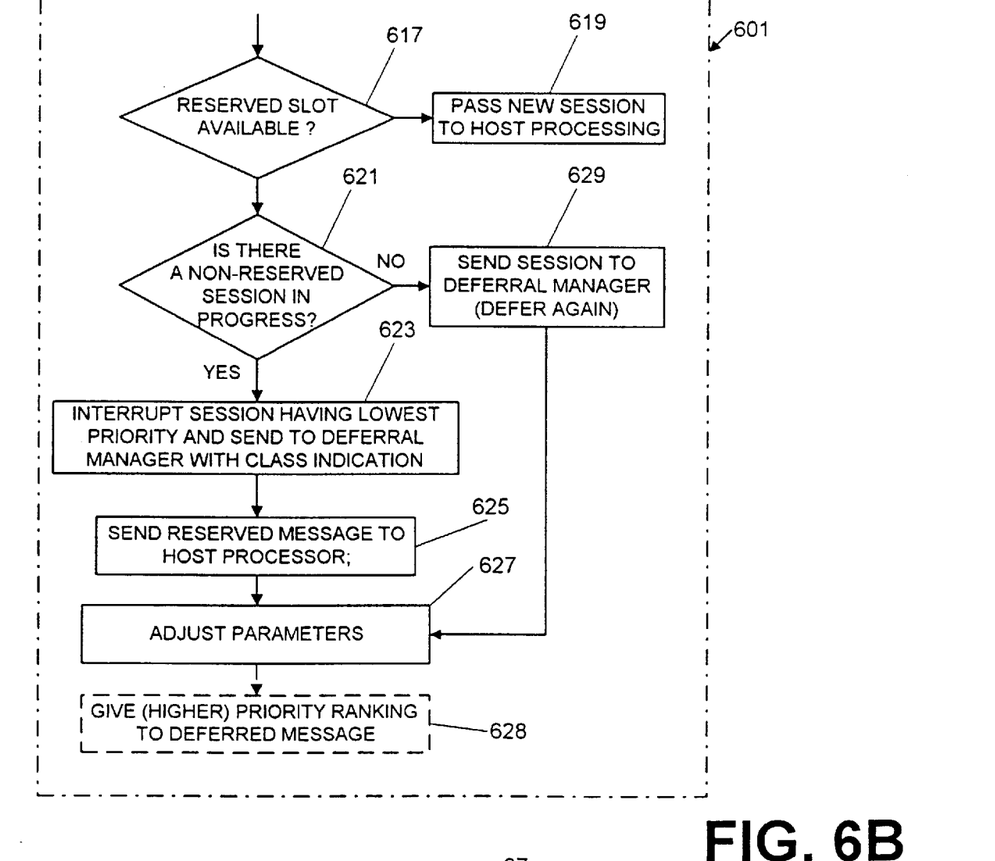
FIG. 6B is a flow diagram which indicates alternative operation of the block 600/601 of FIG. 2, namely, a portion of the admission control gateway which processes or defers new sessions based on the use of contention slots and reserved slots; in this embodiment, the host maintains a variable load threshold used to admit sessions which do not have an appointment. The host changes this threshold to hold more resources in reserve at times when larger volume of reserved access are expected.

FIGS. 6A and 6B respectively indicate operation of the admission control gateway 25 in the case of multiple classes of service and in the case of contention and reserved time slots. These two embodiments differ from one another primarily in the fact that reserved time slots are "held open," e.g., the set of parameters that are used to define maximum desired processing load are made to be dynamic, so as to limit processing of contention messages (that is to say, sessions not having a reserved time slot) when the server is awaiting sessions having a reserved time slot.

FIG. 6A provides an expanded view of block 600/601 seen in FIG. 2 and labeled as block 600 in FIG. 6A. The admission control gateway first checks the priority "k" of a message, which can vary from one to "n." The first processing block 603 of FIG. 6A returns the value "k" for a determination of whether the server has resources available to process the message as a new session.

The motivation for multiple classes can vary: for example, the admission control system can be designed to support multiple deferrals with a higher priority in admission given to those messages deferred more than one (such that messages deferred twice would be given priority over messages deferred once); the multiple classes can also be designed to support one or more web pages, where perhaps one web page provider is paying for a premium service for better service than another web page provider.

A decision function 605 determines whether processing resources are used by classes having priority less than "k." In the preferred embodiment (where only two classes are used), this inquiry is resolved by determining whether non-priority sessions are in-progress. It will be recalled that a block discussed above in connection with FIG. 2 determines whether processing resources are available and admits messages on that basis; consequently, when operation of the admission control gateway reaches the block 605, it has already been determined that the server has already exceeded its maximum load, and that no more processing resources are available. If the decision function determines that the newly-received message represents the lowest priority session, then the message and its corresponding session are again deferred as indicated by function block 607; optionally, the embodiment of FIG. 6A can again increase the priority of a message to "k+1" as indicated by a function block 609 seen at the bottom of FIG. 6A. If, on the other hand, there is a lower priority session in-progress, the admission control gateway identifies this session in-progress and interrupts that session, sending it to the deferral manager to make room for the new, higher priority message (as designated by numerals 611 and 613, respectively). The newly-received, higher priority message is then admitted to the system as indicated by function block 615, while the deferral manager formats a deferral message corresponding to the lowest priority message which was deferred, and assigns it a higher priority and a later appointment.

Use of contention and reserved time slots is illustrated with reference to FIG. 6B, in which processing functions bear the group reference 601, corresponding to the block 600/601 from FIG. 2. As was mentioned earlier, if reserved and contention time slots are used, messages having an appointment should not be placed into contention time slots, and thereby overly limit host processing; the processing indicated by FIG. 2 should have a mechanism that achieves this function. Alternatively, entry into processing 601 represented by FIG. 6B could be performed prior to a determination of whether the server has spare processing resources which are available.

A first decision block 617 of FIG. 6B determines whether there is a reserved slot which is available for a message, and messages satisfying this criteria are admitted to the server, as indicated by reference numeral 619. If the reserved slots are all taken (for example, processing for a prior priority session has taken an excessive amount of time), then a second decision block 621 is called upon to determine whether there are lower priority sessions in-progress. The lowest priority session in-progress can be interrupted and sent to the deferral manager (with an increase in priority for deferred handling), all as indicated by blocks 623, 625 and 628 of FIG. 6B. On the other hand, if no lower priority sessions are available, then the newly-received message must be assigned another reserved time slot and is sent to the deferral manager, as indicated by dashed-line processing block 629. The system can then proceed to adjust parameters for future times, corresponding to future slot reservation, as indicated by function block 627.

The use of contention and reserved slots can be implemented in situations where average session length is fairly long, greater perhaps than a few minutes. In such cases, it may be desired to limit acceptance of new, contention messages, if the admission control gateway is expecting a large number of new sessions having appointments.

In view of the foregoing description, various alternative embodiments of the present invention will occur to those having skill in electronics. For example, various software alternatives will also occur to those having programming skill which effects deferral of messages without departing from the spirit of the present invention. The admission control gateway, deferral manager and scheduler, above, are typically implemented with a single set of code having various arrangements of routines and subroutines, but some of these functions could also be implemented in hardware or firmware. Other mechanisms for assisting admission control on the client side may be used instead of the mechanisms described above.

Having thus described several exemplary implementations of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the foregoing discussion is intended to be illustrative only; the invention is limited and defined only by the following claims and equivalents thereto.

I claim:

1. An admission control system that selectively admits messages of a stream of messages from at least one client system to a host, comprising:

a resource monitor coupled to the host that measures processing resources of the host, the resource monitor providing an indication of processing resources available to the host;

a deferral manager that receives deferred messages and that responsively determines a time when deferred messages can be processed by the host; and an admission control gateway that receives both the stream of message and the indication from the resource monitor, the admission control gateway determining whether each message in the stream corresponds to a session in-progress and, if a message corresponds to a session in-progress, responsively admitting the message to the host, determining whether messages from the stream not corresponding to a session in-progress can nevertheless be processed by the host, including for at least some messages in the stream, comparing the indication with a threshold, and if a result of comparing indicates additional processing capacity within the threshold, admitting the at least some messages as new sessions, and if a particular message does not correspond to a session in-progress and a result of determining does not indicate that the particular message can be processed by the host, then sending the particular message to the deferral manager as a deferred message;

wherein the deferral manager sends a deferral message to a client system corresponding to a deferred message which includes an indication of a time when the deferred message can be processed by the host.

2. An admission control system according to claim 1, wherein determining whether messages from the stream not corresponding to a session in-progress can nevertheless be processed by the host includes:

determining whether a message in the stream is a priority message and admitting the priority message to the host processor.

3. An admission control system according to claim 2, wherein:

the deferral manager formats the message sent to the client system to include a key indicating priority status; and determining whether a message in the stream is a priority message includes receiving a key from the client system indicating priority status.

4. An admission control system according to claim 2, wherein:

the deferral manager causes storage in said admission control system of a client system indicator; and determining whether a message in the stream is a priority message includes determining whether there is a corresponding client system indicator which has been stored in said admission control system.

5. An admission control system according to claim 1, wherein the host processor is a web server.

6. An admission control system according to claim 1, wherein:

said admission control system further comprises a scheduler which, together with the deferral manager, reserves time slots for future access corresponding to the deferred messages;

the time is a specific time; and determining whether messages from the stream not corresponding to a session in-progress can nevertheless be processed by the host includes determining whether a message in the stream corresponds to a reserved slot within a specific range of time that depends upon the specific time.

7. An admission control system according to claim 6, wherein at least one of the scheduler and deferral manager causes the threshold to be varied at a future time to limit processing of messages in unreserved time slots.

8. An admission control system according to claim 6, wherein the scheduler assigns reserved time slots by interacting with the client system to give the client system a choice of time slots.

9. An admission control system according to claim 1, wherein:

said admission control system further comprises a scheduler which, together with the deferral manager, reserves time slots for future access corresponding to the deferred messages;

the time is a range of specific time; and determining whether messages from the stream not corresponding to a session in-progress can nevertheless be processed by the host includes determining whether a message in the stream has an associated identifier which corresponds to a reserved slot within a specific range of time dependent upon the range of specific time.

10. An admission control system according to claim 1, wherein the deferral message is formatted by the deferral manager to include a key which must be presented upon repeated attempt to access the host processor in order to receive priority processing.

11. An admission control system according to claim 10, wherein the deferral manager transmits the deferral message to the client system in such a manner that it writes the key as a cookie to the client system.

12. An admission control system according to claim 10, wherein the deferral message is formatted to pass the key as a password to a web browser of the client system.

13. An admission control system according to claim 1, wherein the deferral message includes a program file adapted to cause the client system to resend a message to the host processor at the time when the deferred message can be processed by the host, irrespective of whether a web browser is active upon the client system.

14. An admission control system according to claim 1, wherein the deferral message includes a web page having a countdown time, the web page adapted to cause a browser of the client system to resend a message to the host processor at the time when the deferred message can be processed by the host.

15. An admission control system according to claim 14, wherein the web page is adapted to cause a browser of the client system to resend a message to the host processor at the time in a manner which is elective to a user of the client system.

16. An admission control system according to claim 1, further comprising means for determining, for each message which has priority access, whether sufficient resources of the host processor are available, and if insufficient resources of the host processor are available, for also interrupting and deferring a session of lower priority in-progress to make room for a session of higher priority.

17. An admission control system according to claim 1, further comprising means for ending a session that has been in-progress for greater than at least a predetermined amount of time.

18. An improvement in an admission control system that selectively admits and defers incoming messages sent from at least one client system, the admission control system consisting of at least one of software, firmware and hardware to effect admission control for a server, said improvement comprising:

determining whether incoming messages correspond to a session in-progress and admitting to the server those incoming messages which do correspond to a session in-progress;

for incoming messages not corresponding to a session in-progress, comparing current server processing resources with at least one predetermined parameter and responsively determining whether a session corresponding to the message can be processed without burdening server processing resources beyond an amount indicated by a predetermined parameter;

for incoming messages not corresponding to a session in-progress,
determining whether the message has been previously deferred by said admission control system, and
if the message has been previously deferred by said admission control system, then admitting the message as a new session;

deferring incoming messages which do not correspond to a session in-progress, have not been previously deferred by said admission control system and cannot be otherwise processed without burdening server resources beyond the amount indicated by a predetermined parameter, including
assigning a time indicator to those messages which are deferred for later admission to the server on a priority basis, and transmitting an indication of deferral and the time indicator to the client system, and
creating a priority indicator associated with deferred messages of prior deferral by said admission control system, the priority indicator adapted for use by said admission control system in determining whether a corresponding message has been previously deferred.

19. An improvement according to claim 18, further comprising:

automatically causing a client system to re-submit a deferred message to a host at substantially the later time.

20. An improvement in a browser adapted for use upon a client system to access a host, the browser adapted for use in connection with an admission control system that admits and defers messages on a priority basis, wherein the admission control system includes an admission control gateway and a deferral manager, and the deferral manager both sends to the client system a deferral message indicating that a previously submitted message has been deferred and includes with the deferral message an indication of a time when the deferred message can be later processed by the host, said improvement comprising:

a buffer adapted to store at least one host address and the indication of time;

a clock that determines a time when the deferred message can be processed by the host; and means coupled to the clock for sending at the time determined by the clock a deferred message to the admission control system that enables admission of the deferred message on a priority basis.

21. An improvement according to claim 20, wherein the buffer is further adapted to store a key that must be presented to the admission control system for admission on a priority basis.

22. An improvement according to claim 20, wherein the means for sending a deferred message includes means for automatically opening a new browser window and for automatically sending the deferred message in association with the new browser window.

23. An improvement according to claim 20, wherein the means for sending a deferred message includes means for sending the deferred message in association with the new browser window at election of a user of the browser.

24. An improvement according to claim 20, wherein:
the buffer is adapted to store a plurality of host addresses and corresponding indications of time; and
means coupled to the clock for sending each deferred message to the admission control system for admission on a priority basis at proper time determined in response to the corresponding indication of time.

* * * * *